(12) United States Patent
Aiello et al.

(10) Patent No.: US 7,121,725 B2
(45) Date of Patent: Oct. 17, 2006

(54) FLUID DYNAMIC BEARING LUBRICANT AIR EXTRACTION DEVICE

(75) Inventors: Anthony Joseph Aiello, Aptos, CA (US); Christopher M. Woldemar, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 52 days.

(21) Appl. No.: 10/381,803

(22) PCT Filed: Jun. 29, 2001

(86) PCT No.: PCT/US01/20994

§ 371 (c)(1),
(2), (4) Date: Jul. 28, 2003

(87) PCT Pub. No.: WO02/27202

PCT Pub. Date: Apr. 4, 2002

(65) Prior Publication Data

US 2004/0218841 A1 Nov. 4, 2004

Related U.S. Application Data

(60) Provisional application No. 60/236,008, filed on Sep. 27, 2000.

(51) Int. Cl.
*F16C 17/10* (2006.01)

(52) U.S. Cl. .................................................... 384/107

(58) Field of Classification Search ................ 384/107, 384/110, 112, 123, 115
See application file for complete search history.

(56) References Cited

U.S. PATENT DOCUMENTS

| | | | |
|---|---|---|---|
| 3,778,123 A | 12/1973 | Hendler et al. | 308/36.3 |
| 5,524,986 A | 6/1996 | Leuthold et al. | 384/119 |
| 5,658,080 A | 8/1997 | Ichiyama | 384/112 |
| 5,707,154 A | 1/1998 | Ichiyama | 384/107 |
| 6,059,459 A | 5/2000 | Ichiyama | 384/112 |
| 6,066,903 A | 5/2000 | Ichiyama | 310/90 |
| 6,196,722 B1 | 3/2001 | Asada et al. | |

FOREIGN PATENT DOCUMENTS

| | | |
|---|---|---|
| EP | 0 552 808 B1 | 7/1993 |
| EP | 0 949 428 A1 | 10/1999 |

*Primary Examiner*—Lenard A. Footland
(74) *Attorney, Agent, or Firm*—Morrison & Foerster LLP

(57) ABSTRACT

The fluid dynamic bearings system of the invention provides a device located in a non-grooved low pressure region located at some point in the overall fluid circulation path of the fluid dynamic bearing to collect and trap any air bubbles which may be found in the fluid of the hydrodynamic bearing. More specifically, the air extraction device of the invention comprises a shallow angle V-shaped region which is located in fluid communication with but not in a grooved region of the hydrodynamic bearing. In summary, according to the present invention the hydrodynamic bearing comprises a shaft with a thrust plate at or near at least one end thereof. The thrust bearings are formed on the upper and lower surfaces of the thrust plate (301) and journal bearing (320) on the shaft or facing sleeve surface. Lubricant lies between each of these surfaces and facing surface of a sleeve (312) or counter-plate (308) which overlies the thrust bearing, and fluid lies in all these regions. In the region on the outer surface of the counter-plate distant from the shaft (322) and facing the counter-plate (308) a countersink (340) is formed on the axial face of the thrust plate (301) and end of bearing shaft with a shallow angle such that the force of surface tension forms a meniscus between the air and the lubricant along the surface of the countersink angle period. Lubricant circulation path-holes (380,382) are provided from, this countersink region to the region at the junction between the shaft and the thrust plate which also between the journal bearing and the thrust bearing. Thus the fluid can pass through these circulation holes extending from the journal and thrust plate up to the countersink region, and form a capillary seal on either side of the countersink region adjacent the thrust bearing. As an alternative, the shallow angled region may also be located on the outer diameter of the thrust plate or on the shaft adjacent the journal bearing.

7 Claims, 4 Drawing Sheets

FLUID DYNAMIC BEARING LUBRICANT AIR EXTRACTION DEVICE

This application claims benefit of U.S. Provisional Application No. 60/236,008, filed Sep. 27, 2000 entitled FLUID DYNAMIC BEARING LUBRICANT AIR EXTRACTION DEVICE all of which is hereby incorporated by reference in its entirety.

FIELD OF THE INVENTION

The invention relates to the field of hydrodynamic bearing assemblies. More specifically, the invention relates to the design that reduces the effect of air in the fluid of a hydrodynamic bearing.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle. The information is accessed by means of read/write heads generally located on a pivoting arm that moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside a hub that supports the discs. One type of motor in common use is known as an in-hub or in-spindle motor. Such in-spindle motors typically have a spindle mounted by means of two ball or hydrodynamic bearing systems to a motor shaft disposed in the center of the hub. Generally, such motors include a stator comprising a plurality of teeth arranged in a circle. Each of the teeth support a plurality of coils or windings that may be sequentially energized to polarize the stator. A plurality of permanent magnets are disposed in alternating polarity adjacent the stators. As the coils disposed on the stators are sequentially energized in alternating polarity, the magnetic attraction and repulsion of each stator to the adjacent magnets cause the spindle to rotate, thereby rotating the disc and passing the information storage tracks beneath the head.

The use of hydrodynamic bearing assemblies in such drive systems has become preferred due to desirable reductions in drive size and noise generation as compared to conventional ball bearing drive systems. In hydrodynamic bearings, a lubricating fluid, such as oil or air, functions as the bearing surface between a base or housing and a spindle or hub. As the lubricating fluids require small gaps between the stationary and rotating members in order to provide the support, stiffness and lubricity required for proper bearing operation, conventional drive components and assemblies typically require tight tolerances and demand precision assembly methods.

Despite the use of such precise and controlled assembly methods, air bubbles may be introduced into the fluid which supports the relatively rotating services for rotation of the bearing assembly. Thus the problem presented is to establish a reliable bearing design in which the possibility of the existence of air bubbles in the fluid between the relatively rotating grooved hydrodynamic bearing surfaces is diminished.

More specifically, in fluid dynamic bearings, a important goal is low non-repeatable runout (NRR) to optimize tracking and track density. In a fluid dynamic bearing motor, one potential source of NRR is the presence of air in the grooved regions of the bearing, causing lubricant pressure instability and consequential rotor displacement. The presence of air in the bearing lubricant can result from partial fill of the bearing cavity with lubricant or air ingestion due to a combination of conditions including thermal contraction of the lubricant and part tolerances such as cylindrical taper in a journal bearing or symmetrically formed bearing grooves. Due to the lubricant's tendency to flow throughout the bearing due to pressure gradients caused by part tolerances, air bubbles can be swept into the grooved regions of the bearing, resulting in NRR events. Therefore, the problem presented is to adopt a design which eliminates or diminishes the problem of air bubbles being swept into or residing in the grooved bearing regions of a hydrodynamic bearing.

SUMMARY OF THE INVENTION

The present invention seeks to provide a method and apparatus for minimizing or diminishing the tendency of air bubbles to be swept into grooved regions of a hydrodynamic bearing.

More specifically, the present invention seeks to improve the operation of a hydrodynamic bearing by providing a solution to the problem created by air ingestion into a fluid in a hydrodynamic bearing of unstable operation.

Yet another objective of this invention is to provide a novel method and apparatus for collecting and trapping air bubbles as they circulate through a fluid dynamic bearing.

A related objective of the invention is to provide a novel system and method for trapping air bubbles in a hydrodynamic bearing by establishing a device to capture air bubbles that is located in a region of low pressure which is in the fluid path of the hydrodynamic bearing but outside of the grooved portion of the hydrodynamic bearing. By keeping the air bubbles outside of the grooved region of the bearing, this air extraction device protects the grooved regions of the bearing from pressure gradient disruptions and resulting NRR events.

In summary, according to the present invention, the fluid dynamic bearings system of the invention provides a surface tension seal in a non-grooved low pressure region located at some point in the overall fluid circulation path of the fluid dynamic bearing to collect and trap any air bubbles which may be found in the fluid of the hydrodynamic bearing.

More specifically, the air extraction device of the invention comprises a shallow V-shaped feature or counter sink which is located in fluid communication with but not in a grooved region of the hydrodynamic bearing.

In summary, according to the present invention the hydrodynamic bearing comprises a shaft with a thrust plate at or near at least one end thereof. Thrust bearings are formed on the upper and lower surfaces of the thrust plate and a journal bearing on the shaft or facing sleeve surface. Fluid is maintained between the grooved surface of a sleeve or thrust plate and the facing surfaces.

According to the invention, in the region on the outer surface of the thrust plate distant from the shaft and facing the counterplate, a shallow angle countersink is defined in the low pressure region adjacent to but separate from the thrust bearings. The shallow angle of the countersink is such that the force of surface tension forms a meniscus between the countersink surface and the facing counterplate surface which separates the air and the lubricant.

In the preferred embodiment, lubricant re-circulation path-holes are provided from this countersink region to a region at a junction between the, shaft and the thrust plate i.e. between the journal bearing and the thrust bearing.

Thus the fluid can pass through these re-circulation paths extending from the journal and thrust plate up to the countersink region, a capillary seal is formed surrounding the countersink region adjacent the thrust bearing. The shallow angles of the countersink region utilize surface tension to form a capillary seal just inside the countersink region adjacent the thrust bearing. This capillary seal defines the low while allowing any air bubbles to be attracted to this region and then trapped within this region, extracting the air bubbles from the lubricant.

In an alternative approach, a shallow angled region may be formed at the radial end of the thrust plate in the fluid circulation path around the thrust plate so that any air bubbles will tend to be drawn from the fluid into this low pressure region. In yet another alternate embodiment, the shallow angled region is defined adjacent the shaft in the low pressure region between the journal bearings.

BRIEF DESCRIPTION OF THE DRAWINGS

So that the manner in which the above recited features of the present invention are obtained and can be understood in detail, a more particular description of the invention, briefly described above, may be had by reference to embodiments which are illustrated in the following drawings. However, it is to be noted that the following drawings illustrate only typical embodiments of the invention and are therefore not to be considered limiting of its scope, for the invention may admit to other equally effective embodiments.

DETAILED DESCRIPTION OF THE PREFERRED EMBODIMENTS

Figure 1:
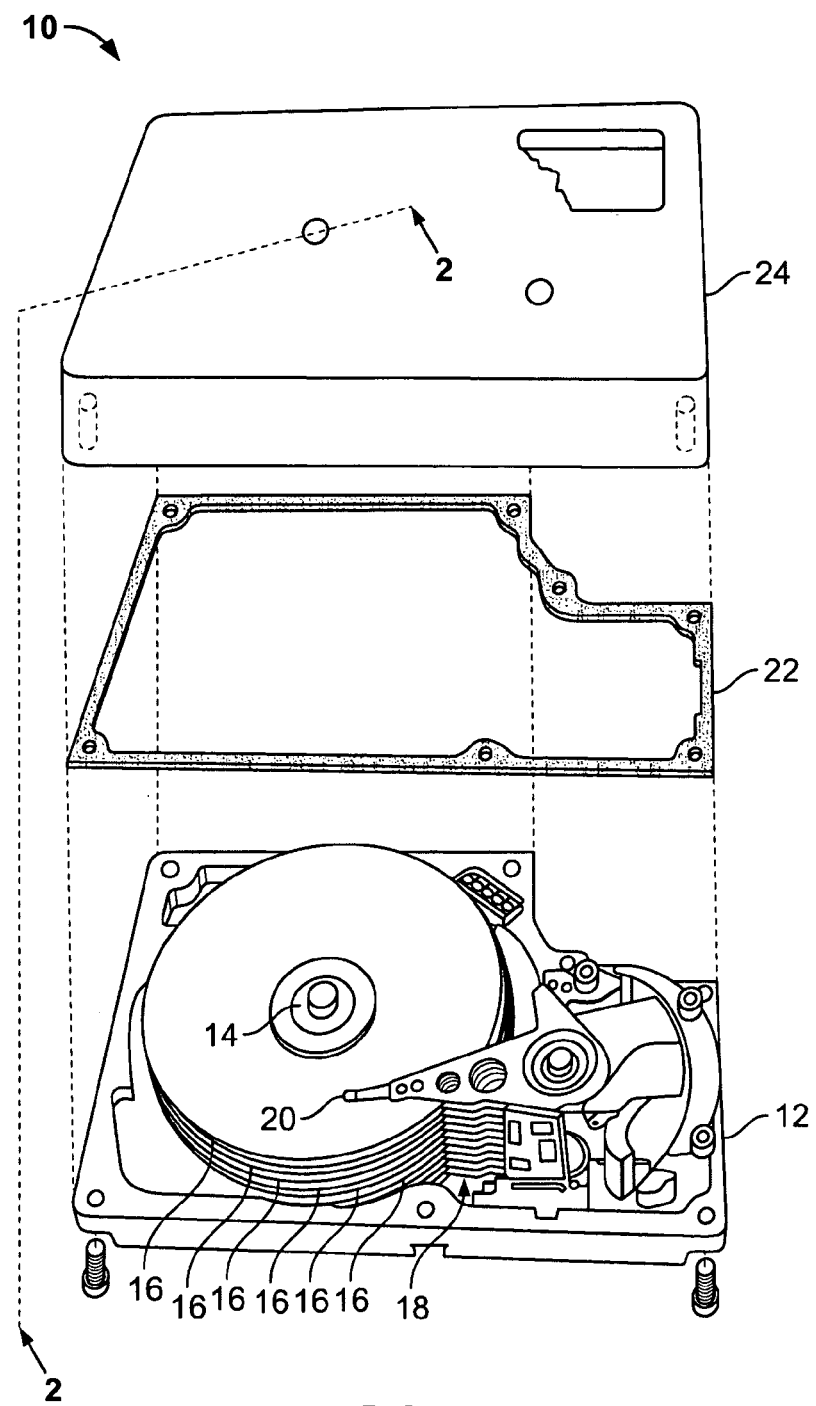
FIG. 1 is a top plan view of a disc drive data storage device in which the present invention may be especially useful.

The invention comprises a spindle motor for a disc drive data storage device having a thrust plate type hydrodynamic bearing. FIG. 1 is a plan view of a typical disc drive 10 wherein the invention is useful. Disc drive 10 includes a housing base 12 and a top cover 14. The housing base 12 is combined with top cover 14 to form a sealed environment to protect the internal components from contamination by elements from outside the sealed environment.

The base and top cover arrangement shown in FIG. 1 is common in the industry. However, other arrangements of the housing components have been frequently used, and the invention is not limited to the configuration of the disc drive housing. For example, disc drives have been manufactured using a vertical split between two housing members. In such drives, that portion of the housing half that connects to the lower end of the spindle motor is analogous to base 12, while the opposite side of the same housing member, that is connected to or adjacent the top of the spindle motor, is functionally the same as the top cover 14.

Disc drive 10 further includes a disc pack 16 that is mounted for rotation on a spindle motor (not shown) by a disc clamp 18. Disc pack 16 includes one or more individual discs that are mounted for co-rotation about a central axis. Each disc surface has an associated head 20 that is mounted to disc drive 10 for communicating with the disc surface. In the example shown in FIG. 1, heads 20 are supported by flexures 22 that are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 32. While a rotary actuator is shown in FIG. 1, the invention is also useful in disc drives having other types of actuators, such as linear actuators.

Figure 2:
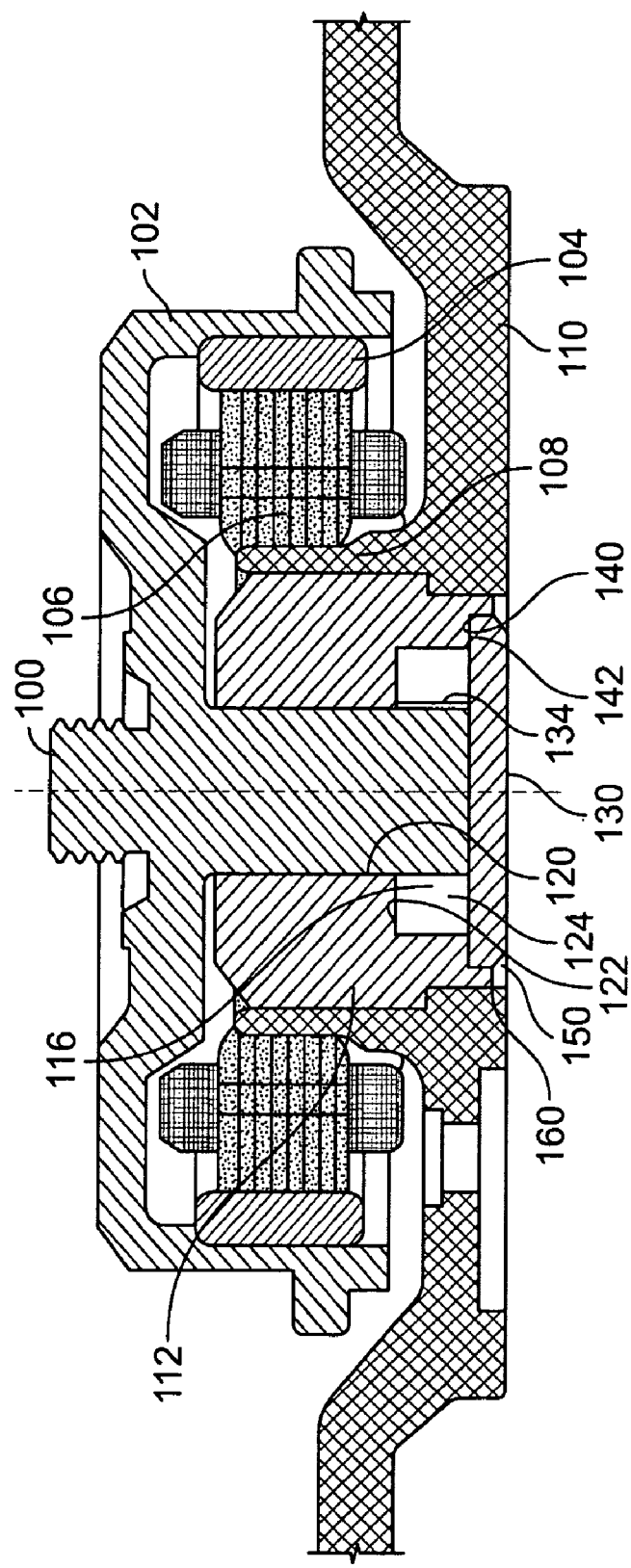
FIG. 2 is a vertical sectional view of a typical disc drive spindle motor in which the present invention may prove to be useful.

FIG. 2 shows a rotating shaft 100 spindle motor design in which the shaft is integrated with the hub 102 which carries flange 103 which functions as a disc support surface. The shaft with the hub 102 supports a magnet 104 on its inner axial surface, facing stator 106 whose energization causes stable rotation of the hub. The stator in turn is supported on an axial extension 108 of base casting 110. A sleeve 112 which supports the shaft 100 and its associated thrust plate 116 is incorporated into the axial extension 108 of the base 110. This sleeve 112 has axial surface 120 that faces a surface of the shaft. These two surfaces define a journal bearing which is of standard design and not further shown. Further, the thrust plate at surfaces 122 and 124 define in cooperation with the sleeve 112 and the counterplate 130 thrust bearings of the fluid dynamic type which further support the shaft against axial forces. Each of these journal and thrust bearings require fluid in the gap between the facing surfaces. This fluid may either recirculate through an internal channel 134 which either passes through the thrust plate or between the thrust plate and shaft, or through a central bore. To prevent the escape of any fluid between the surface 140 of the sleeve and the complementary surface 142 of the thrust plate, a laser weld has been applied at the junction at the axially outer edge of the counterplate 130 and the sleeve 112. This laser weld is applied using well-known techniques and technology but by its very simplicity enhances the reliability.

Figure 3A:
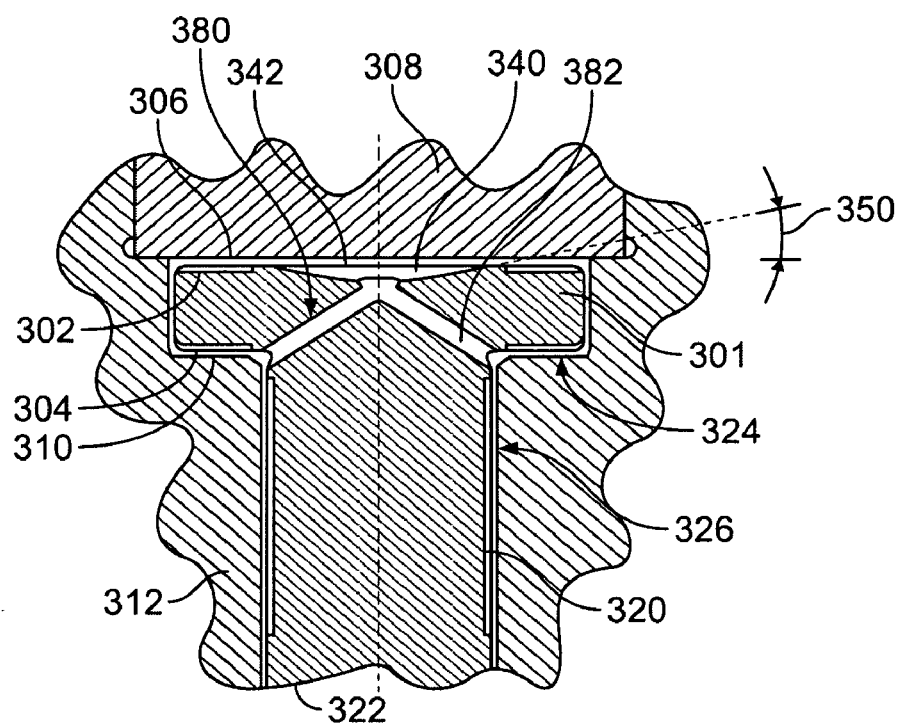
FIGS. 3A and 3B are partial sectional view of the shaft thrust plate and counterplate of a hydrodynamic bearing showing the countersink and re-circulation paths are utilized to trap and eliminate air bubbles in the present invention.
Figure 3B:
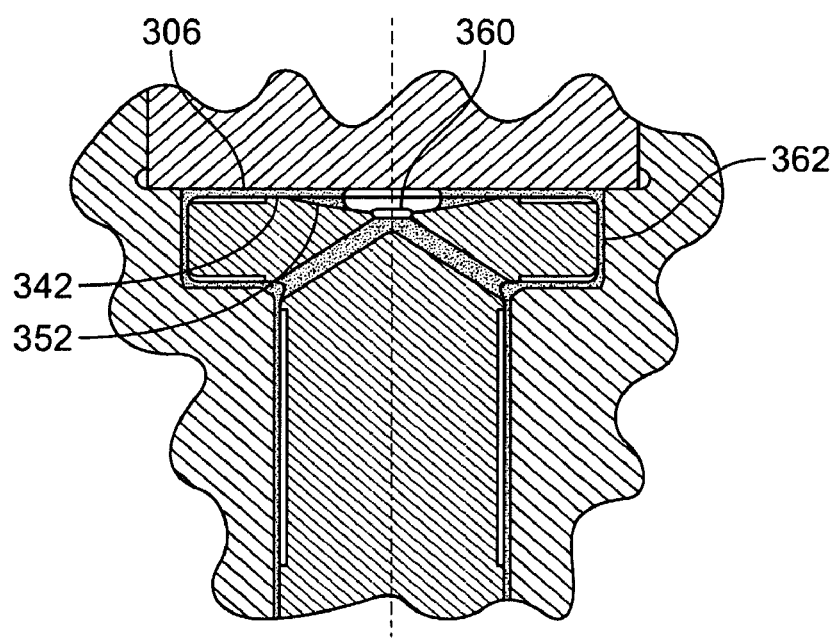

Given the knowledge of the basic operation of a thrust plate and shaft combination to support rotation of the hub, attention is directed next to FIGS. 3A and 3B. FIG. 3A shows the combination of thrust plate and shaft without the lubricant needed to support relative rotation of the bearing parts; FIG. 3B shows the system with the lubricant. Referring first to FIG. 3A, this figure shows thrust bearings 302, 304 on the upper and lower surfaces of the thrust plate 301, facing respectively a surface 306 of counterplate 308 and a surface 310 of sleeve 312. The same figure also shows a journal bearing 320 defined on the outer surface of the shaft 322, and cooperating with the inner surface 324 of the sleeve 312 to form a journal bearing. The thrust bearings and journal bearings together support the shaft 322 and sleeve 312 for relative rotation. In this figure, the grooves which define the bearing appear on the surface of the thrust plate and shaft; however, they can just as well be defined on the corresponding surface of the counterplate 308 and sleeve 312.

It is well-known and has been described above, that it is essential to avoid nonrepeatable runout and maintain proper and uninterrupted support for the relative rotation of shaft, thrust plate and sleeve and thereby rotation of the disc or discs supported on the sleeve, that no air bubbles occur in the lubricant which provides the bearing. Despite the best defined approaches to assembling and filling the hydrodynamic bearing, it is not uncommon for bubbles to occasionally to be found in the system of a hydrodynamic bearing. Therefore, according to the present invention, the design shown in FIG. 2 is modified. In a first embodiment of the invention, a shallow angle countersink 340 is defined on the axial face 342 of the end of the bearing shaft or the thrust plate surface. The countersink is formed with a sufficiently shallow angle 350 that the force of the surface tension between the two angled surfaces which are the end surface or face surface of the thrust plate 342 and the facing surface 306 of the counterplate that a meniscus 352 (see FIG. 3B) is defined between the air 360 and the lubricant 362. This design modification establishes means for entrapping air bubbles formed in the fluid circulation path in the low pressure region adjacent the thrust bearing on the axial surface of the thrust plate. The shallow angle 350 of the countersink surface relative to the facing surface 306 of the counterplate utilizes surface tension to form the capillary seal or surface tension meniscus 352, which will retain the large air bubble 360 in this low pressure region wherein air bubbles will congregate and be trapped.

To further optimize benefits of this countersink, a further modification of the design of FIG. 2 is proposed. Specifically, without any further modification, the circulation holes 134 (FIG. 2) which are defined between the thrust plate and the outer surface of the shaft would terminate facing the counterplate either close adjacent to the capillary seal or even outside of the capillary seal. Thus, it would be possible for fluid to circulate through the system without being passed through the counter sink region and the countersink 340 formed in the countersink region, thereby not achieving the full benefits of this invention.

Therefore, the recirculation path holes which extend from the region intermediate the thrust plate bearing 304 and the journal bearing 320 are redirected through the shaft to lie at a fairly shallow angle and run preferably to the shallowest portion, but at least to some part of the region inside the meniscus 352. This connection of the recirculation path 380, 382 which may comprise one or a plurality of holes running at a fairly shallow angle from, as shown in this embodiment (and preferably, but not necessarily at this corner) a region between the thrust plate bearing and the journal bearing corner formed by the thrust plate and shaft, to a point in the countersink 340. It has been found that with typical fluid circulation caused by the pumping effect of the thrust bearing grooves and journal bearing grooves, that bubbles to the extent that they exist, will tend to move into these recirculation path holes 380,382 and the circulation will then tend to cause these bubbles to move into the countersink 340 and be retained there by this meniscus 352. Once these bubbles are drawn into the low pressure region in the countersink, the air bubbles are trapped by the capillary seal or surface tension meniscus 352.

Among the many advantages of adoption of this design in addition to the apparent one of implementing trapping of the air bubbles in the system, is that this modified design is easy to manufacture, in requiring only the shallow countersink at the end of the shaft or at the surface of the thrust plate aligned with the end of the shaft; and the provision of both plurality of the easily formed shallow holes 380, 382 extending from the region between the journal bearing and thrust bearing to a point inside the countersink 340. Addition of this countersink 340 at a shallow angle relative to the surface thrust plate in which the counter sink is defined causes the low pressure region to add little lubricant volume to the overall fluid dynamic bearing, and therefore has little impact on the lifetime of the bearing.

Further, the connection of the countersink to the recirculation path by the modified lubrication recirculation path holes 380,382 incorporates these recirculation path holes into the air bubble collection process, and optimizes the air bubble collection process.

Figure 4A:
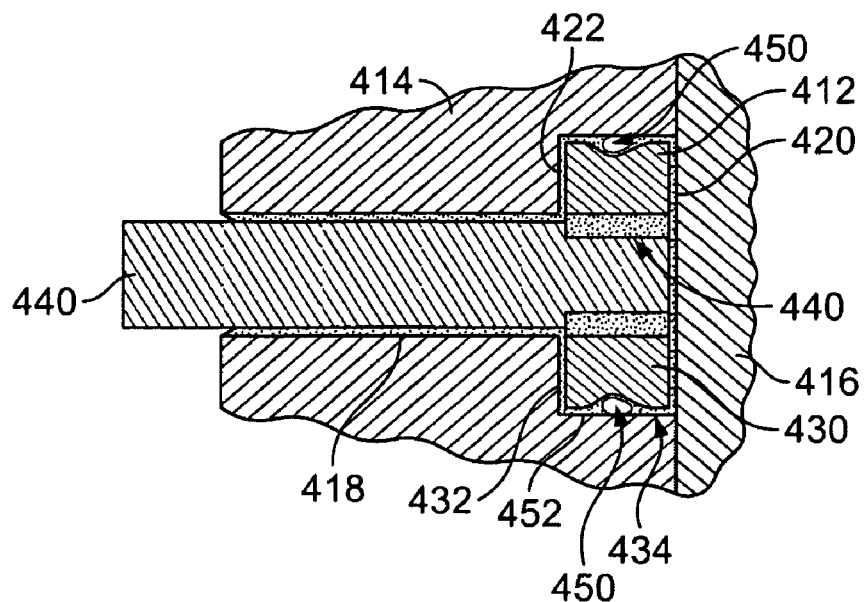
FIGS. 4A and 4B illustrate further alternative embodiments of, the invention.
Figure 4B:
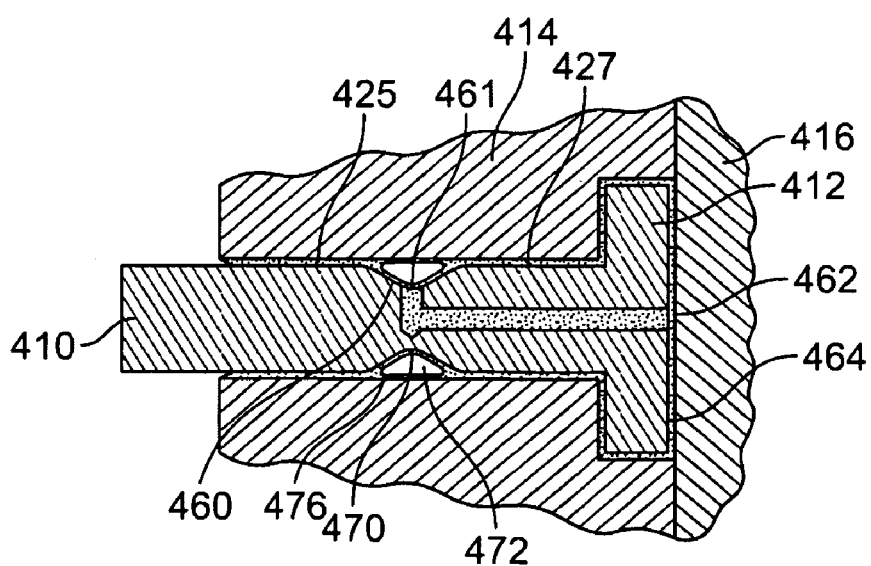

Two further alternative embodiments appear in FIGS. 4A and 4B. Both of these comprise alternative modifications to the motor and bearing design shown, for example, in FIG. 2, although these designs could be used to enhance the operation of any combination of a shaft supporting a thrust plate for relative rotation with a surrounding sleeve and counterplate. In the embodiment of FIG. 4A, a shaft 410 is shown supporting a thrust plate 412 at an end thereof. A sleeve 414 supports a counterplate 416 so that relative rotation between the sleeve and the shaft can be supported by the fluid in the gap 418. As is well-known in this field and described above with respect to the embodiments of FIGS. 3A and 3B, thrust bearings 420, 422 are provided between the axial surfaces of the counterplate and the facing surfaces of the sleeve 414 and the counterplate 416. Fluid circulates as shown in the figure, both over the outer surfaces of the shaft 418, over the radial surfaces 430, 432 of the thrust plate, over the outer diameter surface 434 of the thrust plate, and through the circulation holes or openings 440, which connect the gaps adjacent the axial surfaces of the counterplate 440 and the gap adjacent the shaft 418 where journal bearings are typically defined. In order to provide the means for entrapping air bubbles in this fluid circulation path, shallow angle v-shaped region 450 is defined in the outer diameter surface 452 of the thrust plate 412.

As explained above, with respect to the embodiment of FIGS. 3A and 3B, this shallow angle region causes the formation of a meniscus at either end thereof, creating a fairly large air bubble in the shallow angle region in which air bubbles which would normally circulate through the circulation path and pass over the grooved regions of the thrust bearing and/or journal bearings entrapped in this major air bubble 450. Therefore, by adopting this design, stability of the system is enhanced.

In yet another alternative approach, shown in FIG. 4B, across a combination of shaft 410 and thrust plate 412 is again provided for establishing relative rotation between that combination and the sleeve 414 and counterplate 416. In this design, the return path is defined between the journal bearings 425, 427 which support the shaft 410 for rotation, and extends radially away from the low pressure region 460 between these journal bearings towards the center of the shaft. The path then extends axially through the center of the shaft 462 to exit at the center of the thrust bearing 464 on the axially outer surface of the thrust plate 412. In this design of FIG. 4B, the shallow angle v-shaped region 470 is defined at this low pressure area 472 between the journal bearings. As with the previous designs, by establishing this shallow angle v-shaped region, a meniscus 476 is formed around the low pressure region defining a major air bubble 472 therein. This air bubble lies in the low pressure region between the journal bearings 425 and 427, and in the fluid circulation path which includes the gap between the thrust plate and the shaft and surrounding sleeve and counterplate, and the return path through axial bore 462 and radial bore 461. Therefore, any bubbles which are in this path will tend to become entrapped in the large air bubble in the shallow v-shaped region 460, and taken out of circulation in the system.

Other features and advantages of this invention as well as alternative approaches to defining the shallow v-shaped region in a low pressure area of the fluid circulation path in a hydrodynamic bearing design will become apparent to a person of skill in the art who studies this disclosure. Therefore, the scope of this invention is to be limited only by the following claims.

What is claimed is:

1. A hydrodynamic bearing comprising a shaft with a thrust plate mounted at an end thereof, a sleeve mounted for rotation relative to the shaft, a counterplate supported from the sleeve and overlying the thrust plate, the shaft having a journal bearing defined between the shaft outer surface and an inner surface of the sleeve, a thrust bearing on a surface of the thrust plate between the thrust plate and the sleeve, each of the journal bearing and thrust bearing being established by fluid maintained and circulated in a gap between the shaft and thrust plate and the sleeve, the fluid being maintained in a gap which extends between the shaft and the sleeve and between axially upper and lower and radially outer surfaces of the thrust plate and the surrounding sleeve and counterplate and between the shaft and surrounding sleeve and a v-shaped region defined in the gap, wherein an axially upper surface of the thrust plate includes a thrust bearing defined thereon facing the counterplate, wherein the shaft extends through the thrust plate to face the counterplate, and wherein the V-shaped region is a countersink defined at the end of the shaft, coaxial with the center axis of the shaft, and radially interior to the thrust bearing.

2. A fluid dynamic bearing as claimed in claim 1 wherein the countersink is at an angle of about 8–12 degrees with the surface of the thrust plate.

3. A hydrodynamic bearing as claimed in claim 1 wherein the center of the V-shaped region is disposed at the center axis of the shaft.

4. A hydrodynamic bearing as claimed in claim 1 including one or more fluid circulation holes extending from a point between the journal bearing and the thrust bearing on the axially lower surface of the thrust plate at a angle to intersect the countersink defined on the upper surface of the thrust plate.

5. A hydrodynamic bearing as claimed in claim 4 wherein each of the fluid circulation holes meet at about the same point at the center axis of the shaft and countersink.

6. A hydrodynamic bearing as claimed in claim 5 wherein the fluid circulation holes meet the axially upper surface of the thrust plate at a point which is radially interior to the thrust bearing.

7. A hydrodynamic bearing as claimed in claim 6 wherein the countersink is at an angle of about 8–12 degrees with the surface of the thrust plate.

* * * * *